United States Patent [19]

Iwata et al.

[11] Patent Number: 4,952,943

[45] Date of Patent: Aug. 28, 1990

[54] METHOD OF DROP-ON-DEMAND INK JET RECORDING ON SIZED PAPER WITH EXPOSED FIBERS

[75] Inventors: Kazuo Iwata, Yokohama; Shinichi Tochihara, Hiratsuka, both of Japan

[73] Assignee: Canon Kabushiki Kaisha, Tokyo, Japan

[21] Appl. No.: 391,645

[22] Filed: Aug. 7, 1989

Related U.S. Application Data

[63] Continuation of Ser. No. 63,393, Jun. 18, 1987, abandoned.

[30] Foreign Application Priority Data

Jun. 20, 1986 [JP] Japan .................... 61-145618

[51] Int. Cl.$^5$ ............................................. B41J 2/045
[52] U.S. Cl. ................................. 346/1.1; 346/135.1; 346/140 R
[58] Field of Search ............ 346/1.1, 75, 135.1, 346/140 R; 106/20, 22

[56] References Cited

U.S. PATENT DOCUMENTS

| | | | |
|---|---|---|---|
| 4,243,994 | 1/1981 | Kobayashi | 346/140 |
| 4,345,262 | 8/1982 | Shirato | 346/140 |
| 4,352,691 | 10/1982 | Owatari et al. | 106/20 |
| 4,399,443 | 8/1983 | Yasufuku | 346/1.1 |
| 4,636,410 | 1/1987 | Akiya | 346/1.1 X |
| 4,642,654 | 2/1987 | Toganoh | 346/1.1 |
| 4,686,539 | 8/1987 | Schmidle | 346/1.1 |

FOREIGN PATENT DOCUMENTS

| | | |
|---|---|---|
| 0056333 | 7/1982 | European Pat. Off. . |
| 55-29546 | 3/1980 | Japan . |
| 56-57862 | 5/1981 | Japan . |
| 58-13675 | 1/1983 | Japan . |

OTHER PUBLICATIONS

Jaeger et al.; The Influence of Ink/Media Interactions . . . In Jet Printing, Proceedings of the SID, vol. 25/1, 1984, pp. 65–70.

*Primary Examiner*—Joseph W. Hartary
*Attorney, Agent, or Firm*—Fitzpatrick, Cella, Harper and Scinto

[57] ABSTRACT

An ink jet recording method is performed by using the drop-on-demand technique, such that when the volume of ink ejected from one orifice by one ejecting signal is defined as V ($\mu m^3$) and the calculated diameter d ($\mu m$) of ink droplet is defined by the following formula (1):

$$d = 2(3V/4\pi)^{\frac{1}{3}} \tag{1}$$

and the average velocity of ink droplet flying from the orifice to distance of 0.5 mm is defined as v (m/sec), which comprises imparting an ink droplet to a recording medium which is subjected to sizing and has fibers exposed on the surface to be recorded under the conditions which satisfy the following formulae (2) and (3) at the same time:

$$20 \leq d \leq 90 \tag{2}$$

$$6 < v \leq 15 \tag{3}$$

to perform recording, the ink having a surface tension of 35 through 70 dyne/cm at 25° C. and a viscosity of 1.5 through 3.5 cp at 25° C.

3 Claims, No Drawings

METHOD OF DROP-ON-DEMAND INK JET RECORDING ON SIZED PAPER WITH EXPOSED FIBERS

This application is a continuation of application Ser. No. 07/063,393 filed June 18, 1987, now abandoned.

BACKGROUND OF THE INVENTION

1. Field of the Invention

This invention relates to an ink jet recording method, particularly to an ink jet recording method for use with paper generally used in office or home.

2. Related Background Art

Heretofore, various methods have been investigated and proposed for ink jet recording them, so-called the Drop-on-Demand system using paper as the recording medium. Detailed investigations have been made about ink, paper and mechanisms of the printer, etc., since miniaturization of the instrument is possible and the application of the system is extremely broad.

However, the jet printers employing the Drop-on-Demand system of the prior art have several problems, and the greatest problem is that paper generally used in office and home, etc., such as note, report paper, copying paper, letter paper, postcard, etc., cannot be used.

That is, when printing is performed with the various papers mentioned above in a prior art ink jet printer employing the Drop-on-Demand system, printed ink is spread along the fibers of the paper, whereby the shape of the dot becomes indefinite resulting in so-called feathering, therefore, fine rulings, or fine letters for complicated Chinese characters defined by the JIS second standard becomes indistinct and difficult to read in most cases.

Further, the paper mentioned above are frequently treated with sizing in their manufacture so that feathering may be difficult when writing is performed with a writing implement employing an aqueous ink. Similarly when printing is effected with an ink jet printer, penetration of the ink into the paper becomes difficult making the drying characteristics of the ink at the printed portion unsuitable, whereby for example the printed letters maybe contaminated by rubbing with the cover of the printer, and/or that the ink may be attached to hand when the printed matter is touched with hand.

Accordingly, various improvements have been made for the purpose of improving feathering and drying characteristic of the printed letters. For example, in Unexamined Japanese Patent Publication No. 57862/1981, the pH of ink is made strongly alkaline, in Unexamined Japanese Patent Publication No. 29546/1980 a large amount of surfactant is added in the ink, and in Japanese Patent Publication No. 13675/1983 a water-soluble polymer is added in the ink. The method of making the pH of ink strongly alkaline involves the drawbacks such that, for example, it is dangerous when ink is touched with hands, and also both feathering and drying characteristic are not good for papers using a certain kind of sizing agent. In the method in which a large amount of surfactant is added, troubles are seen such that feathering is variable depending on the paper, or the ink may be retracted from the orifice surface depending on the condition of the printer head whereby no ink is ejected, alternatively by wetting of the whole surface of the orifice no ink will be ejected, etc. Further, according to the method in which a water-soluble polymer is added to ink, although feathering and drying characteristics of printed letters are improved in some extent, problems remain such as the ink tends to be dried at the orifice tip of the printer head, and also that normal ejecting is effected when the printer is left to stand in the room for several minutes in a nonprinting state.

Other ink jet recording methods have been proposed to overcome feathering and improve drying characteristics of printed documents. However, these methods have also been unsuccessful in overcoming the drawbacks associated with conventional recording. For instance, U.S. Pat. No. 4,243,994, relating to a liquid ejection printer, taught that it was desirable to utilize ink droplets having a preferred thermal expansion coefficient of between 0.5 and 1.5, a viscosity of between 0.3 and 3.0 centipoise at 20° C., a preferred thermal conductivity of between 1 and 10 ($\times 10^3$ W.cm.deg), a preferred surface tension of between 10 and 60 (dyne/cm) and a preferred pH of between 8 and 11. U.S. Pat. No. 4,345,262, relating to a thermal ink jet printer, taught that droplet adhesion on recording paper was improved when recording was effected by keeping the recording paper away from the position of the discharge orifice by 1.5 mm to 3.0 mm with the "flying speed" of the liquid droplet being approximately 5 m/sec and the moving speed of the recording paper being 0.1 m/sec. U.S. Pat. No. 4,642,654, relating to ink jet printing on coated paper, taught that the diameter of liquid ink droplets of is usually 20–1000 $\mu$m and results are good when the particle size d of the filter and the diameter of the liquid droplet D satisfies the relation that d/D is between 0.03 and 0.3. When d/B is less than 0.03, the amount of the binder for the filler must be significantly decreased so as to obtain a necessary ink absorbing capacity. When the amount of the binder is so decreased, the receiving layer may exfoliate and the receiving member is not practically usable. On the other hand, when d/D exceeds 0.3, the circulatory of the printed dot is lower and poor images result. Accordingly, each of the patents discussed above have independently taught several different approaches to improve recording. However, none of the art discussed above has solved the problems associated with drop-on-demand ink jet recording on a recording medium which has been subjected to sizing, having fibers exposed on its surface, as done in the present invention.

Accordingly, various methods have been attempted for improvement of the mechanisms of printers other than the improvement of ink as mentioned above, but no ink jet recording methods have solved all of the problems such as feathering, drying characteristics of printed letters, drying prevention of ink at the printer head, etc.

SUMMARY OF THE INVENTION

An object of the present invention is to provide an ink jet recording method which can solve the problems possessed by the prior art ink jet recording methods employing the Drop-on-Demand system, namely generation of feathering, drying characteristic of printed letters, etc., when recording is conducted on a normal paper which is subjected to sizing and has fibers exposed on the surface to be recorded, and which is used generally in office, home, etc.

The above object can be accomplished by the present invention. The present invention relates to an ink jet recording method according to the Drop-on-Demand system, when the volume of ink ejected from one orifice by one ejecting signal is defined as V ($\mu m^3$) and the calculated diameter d ($\mu m$) of the ink droplet is defined by the following formula (1):

$$d = 2(3V/4\pi)^{\frac{1}{3}} \qquad (1)$$

and the average velocity of the ink droplet flying from the orifice to a distance of 0.5 mm is defined as v (m/sec), which comprises imparting an ink droplet to a recording medium under the conditions which satisfy formulae (2) and (3) at the same time:

$$20 \leq d \leq 90 \qquad (2)$$

$$6 \leq v \leq 15 \qquad (3),$$

and further to an ink jet recording method characterized in that the ink comprises a water-soluble dye, a water-soluble inorganic solvent and water as main components, and the surface tension $\gamma$ (dyne/cm) of the ink satisfies the following formula (4):

$$70 \geq \gamma \geq 35 \qquad (4)$$

and further the viscosity $\eta$ (cp) of the ink at 25° C. satisfies the following formula (5):

$$1.5 \leq \eta \leq 3.5 \qquad (5).$$

DETAILED DESCRIPTION OF THE PREFERRED EMBODIMENTS

In the ink jet recording method of the present invention, it is an important condition to have a small amount of ink impinged at a high velocity against a recording medium.

That is, when the calculated diameter of the ink droplet calculated from the ejected volume of the ink ejected from one orifice by one ejecting signal is defined as d ($\mu m$) and the average velocity of the ink droplet flying from the orifice to a distance of 0.5 mm is defined as v (m/sec), the above mentioned d and v are required to satisfy the following formulae:

$$20 \leq d \leq 90 \qquad (6)$$

$$6 < v \leq 15 \qquad (7).$$

Further, the ink to be used in the present invention is so called aqueous dye ink, and the surface tension $\gamma$ (dyne/cm) of the ink and the viscosity $\eta$ (cp) at 25° C. are required to satisfy the following formulae (8) and (9):

$$70 \geq r \geq 35 \qquad (8)$$

$$1.5 \leq \eta \leq 3.5 \qquad (9).$$

To describe in more detail, ink droplets with calculated droplet diameter d not more than 20 $\mu m$ could be ejected from the orifice with difficulty in many cases. On the contrary, when ink droplets of 90 $\mu m$ diameter or more are impinged against a recording medium and the average velocity v of the ink droplet is so low as 6 m/sec or lower, the ink acts as if placed gently without spreading on the surface of the recording medium, whereby the apparent thickness of the ink layer on the recording medium becomes thicker, so that prolonged time is required for evaporation of water and solvent in the ink. Thus, the so called drying characteristic of printed letters becomes slower and it cannot be recognized to be a preferable recording method.

On the contrary, if the average velocity of ink droplet exceed 15 m/sec, the ink is rapidly spread on the recording medium, whereby the apparent thickness of ink layer becomes thinner, and although result in good drying characteristic of printed letters. However, scattering phenomenon of the ink tends to be observed when the ink is impinged against the recording medium, and fine ink droplets are attached around the dots on the recording medium to give contaminated printed letters. Thus, this also cannot be recognized to be a preferable recording method.

Accordingly, with regard to d an v, it is required that they should be made within the ranges as shown by the above formulae (6) and (7). More preferably, the ranges of d an v are represented by the formulae $34 \leq d \leq 82$ and $65 \leq v \leq 14$, respectively.

Further, according to the investigation of the surface tension $\gamma$ of ink, when the surface tension of ink is less than 35 dyne/cm, it has been found that in the case when printing is performed under any ink composition and printing condition, at the moment when the ink is impinged against the recording medium or within the time until the ink loses fluidity by evaporation of water or solvent in the ink, the ink is penetrated into the inner portion of the pulp fibers which is constituent of paper or comes irregularly into the space between the pulp fibers to form feathering.

Also, with respect to the viscosity $\eta$ of ink, if it is less than 1.5 cp, no stable ejecting can be obtained, while with an ink exceeding 3.5 cp, too much feathering tends to be generated when printed, although its reason is not clarified. As to the composition of the ink, it is preferable to use so called aqueous dye ink comprising a water-soluble dye, a water-soluble organic solvent and water as main components. As the result of investigation about so called oily ink by use of an oil-soluble dye, it was impossible to make smaller feathering of printing regardless of printing conditions.

As described above, the present inventors have made various investigations on the characteristics of ink, conditions of printing, etc., and consequently accomplished the present invention.

When recording is performed on a recording medium by the recording method of the present invention, ink can be stably ejecting from an orifice.

Also, calling attention on the ink per unit area of the printed portion, when the case of performing printing by spreading uniformly the small ink droplets by impinging them at a certain speed against a recording medium to fill completely the space between dot and dot as in the present invention is compared with the case when printing is performed with relatively slower speed or the case in which printing is performed with large droplets under the condition where no feathering is generated, the recording method according to the present invention because it results in the least amount of ink per unit area, and therefore improving the drying characteristic of the printed letters may be considered to be the best.

Further, as described above, feathering of printed letters can be suppressed, probably because no excess ink exists on the recording medium because the amount of ink per unit area is reduced to a small level. Additionally, as the volatile components such as water, etc. in the ink are evaporated at the printed portion, the viscosity of the ink at the printed portion will be abruptly elevated, whereby the ink droplets lose fluidity suppressing feathering and maintain a dot shape approximate to a true circle. It may be considered that the drying characteristic of the printed matter in practical terms is sufficient when the printed portion maybe touched with fingers, etc.

The ink which can be used in the present invention comprises a water-soluble dye, a water-soluble organic solvent and water as the main components, with its surface tension range being 35 dyne/cm (including 35 dyne/cm to 70 dyne/cm (including 70 dyne/cm), and the viscosity range at the 25° C. being 1.5 cp (including 1.5 cp) to 3.5 cp (including 3.5 cp), and otherwise its composition is not particularly defined.

As the water-soluble dye, almost all of water-soluble acidic dyes, direct dyes, basic dyes, reactive dyes, food dyes as described in color index can be used. Also, any of water-soluble dyes not described in color index can be used.

Examples of water-soluble organic solvent to be used in the present invention may include polyhydric alcohols such as ethylene glycol, diethylene glycol, triethylene glycol, polyethylene glycol, thiodiethanol, propylene glycol, polypropylene glycol, ethylene oxide-propylene oxide copolymer, 1,3-butanediol, 1,4-butanediol, hexylene glycol, glycerin, etc., and derivatives such as alkyl ether, aryl ether thereof, N-methyl-2-pyrrolidone, 1,3-dimethylimidazolidinone, sulforane, γ-butyrolactone, tetrahydrofurfuryl alcohol, diacetone alcohol, triethanolamine, etc. Solvents other than those mentioned above may also be used while controlling the surface tension and the viscosity within the ranges as specified in the present invention when formed into an ink.

The ink to be used in the present invention comprises mainly the components as mentioned above. In addition, there may be added various additive such as surfactants, pH controlling agents, anti-rust agents, preservatives, antifungal agents, antioxidants, evaporation accelerators, chelating agents, etc., if desired.

Also, in the ink jet recording method according to the Drop-on-Demand system in the present invention, the calculated diameter d of ink droplet obtained by calculation from the discharged volume of ink ejected from one orifice by one ejecting signal and the average velocity v of the ink droplet flying from the orifice to a distance of 0.5 mm are specifically defined, but these values of d and v can be set under the specified conditions depending on various conditions such as the kind of the ejecting energy generating source, its size, shape, application voltage, etc., and the general ejecting method and ejecting means of ink are not limited at all.

Therefore, by setting the above various parameters under the conditions as disclosed by the present invention, the effect intended by the present invention can be for the first time exhibited, and various methods for ink jet recording according to the Drop-on-Demand system known in the prior art can be employed as the ejecting methods.

Thus, it is possible to use effectively, for example, the so called Gould type printer utilizing a piezoelectric element, Steme type printer, and also the ink jet system in which ink is ejected from a nozzle by foaming by the action of heat energy by the method as described in Unexamine Japanese Patent Publication No. 59936/1979.

The present invention is described in more detail by referring to Examples. In the Ink examples, all % indicate % by weight.

INK EXAMPLE 1

Ink (1) was prepared according to the following formulation.

| | |
|---|---|
| C.I. Direct Black 154 | 3.5% |
| Ethylene oxide adduct of p-cresol (added with 3 mols of ethylene oxide on an average) | 8.5% |
| Ethylene oxide adduct of phenol (added with 2 mols of ethylene oxide on an average) | 1.5% |
| Polyoxyethylene-polyoxypropylene copolymer (average molecular weight 1000) | 5.0% |
| Ethylene glycol | 5.0% |
| Water | 73.5% |

The above ink (1) had the viscosity at 25° C. of 2.9 cp and the surface tension of 47.3 dyne/cm.

INK EXAMPLE 2

Ink (2) was prepared according to the following formulation.

| | |
|---|---|
| C I. Direct Black 62 | 1.8% |
| Propylene oxide adduct of ethylene glycol (added with 1.2 mols of propylene oxide on an average) | 15.0% |
| Diethylene glycol monomethyl ether | 2.0% |
| Glycerin | 5.0% |
| Scoarol 700 (trade name, nonionic surfactant; produced by Kao Atlas K.K.) | 0.03% |
| Water | 76.17% |

The above ink (2) had the viscosity of 25° C. of 2.4 cp and the surface tension of 38.2 dyne/cm.

INK EXAMPLE 3

Ink (3) was prepared according to the following formulation.

| | |
|---|---|
| Dye represented by the following structural formula | 2.2% |

[Structural formula of dye with SO$_3$Li, N=N, LiO$_3$S, SO$_3$Li, HO, NH$_2$ groups]

| | |
|---|---|
| Diethylene glycol | 15.0% |
| Propylene glycol monomethyl ether | 3.0% |
| Water | 79.8% |

The above ink (3) had the viscosity at 25° C. of 1.7 cp and the surface tension of 55.3 dyne/cm.

INK EXAMPLE 4

Ink (4) was prepared according to the following formula.

| | |
|---|---|
| Dye represented by the following structural formula | 1.9% |

-continued

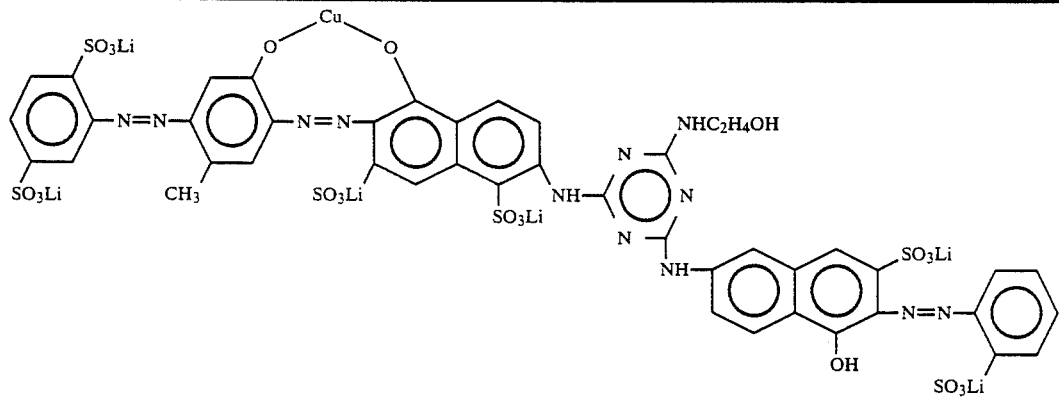

| C.I. Direct Blue 199 | 0.1% |
|---|---|
| Triethylene glycol | 25.0% |
| Polyglyme | 2.0% |
| (trade name, solvent; produced by Toho Kagaku Kogyl K.K.) | |
| Water | 71.0% |

The above ink (4) had the viscosity of 25° C. of 3.3 cp and the surface tension of 49.3 dyne/cm.

INK EXAMPLE 5

Ink (5) was prepared according to the following formula.

| C.I. Food Black 2 | 4.5% |
|---|---|
| Propylene oxide adduct of ethylene glycol (PO 1.2 mols) | 6.0% |
| Diethylene glycol | 20.0% |
| Polyglyme | 4.0% |
| Water | 65.5% |

The above ink (5) had the viscosity at 25° C. of 2.8 cp and the surface tension of 54.8 dyne/cm.

INK EXAMPLE 6

Ink (6) was prepared according to the following formulation.

| Dye represented by the following structural formula | 2.0% |
|---|---|

$$\text{H}_3\text{C}\underset{\text{SO}_3\text{Na}}{\overset{\text{SO}_3\text{Na}}{-}}\text{N}=\text{N}-\underset{\text{SO}_3\text{Na}}{\overset{\text{OH NHCO}-}{}}$$

| Triethylene glycol | 15.0% |
|---|---|
| Triethylene glycol monomethyl ether | 3.0% |
| Ethylene oxide adduct of p-cresol (added with 2.5 mols of EO on an average) | 2.0% |
| Water | 78.0% |

The above ink (6) and the viscosity at 25° C. of 2.9 cp and the surface tension of 51.1 dyne/cm.

INK EXAMPLE 7

Ink (7) was prepared according to the following formula.

| C.I. Direct Black 62 | 1.8% |
|---|---|
| Propylene oxide adduct of ethylene glycol (added with 1.2 mols of propylene oxide on an average) | 15.0% |
| Diethylene glycol monomethyl ether | 2.0% |
| Glycerin | 5.0% |
| Scoarol 700 | 0.0005% |
| Water | 76.2% |

The above ink (7) had the viscosity at 25° C. of 2.4 cp and the surface tension of 54.2 dyne/cm.

The above inks (1)–(7) were applied to a printer and printed on a commercially available copying paper. The recording conditions are shown in Table 1 and recording characteristics in Table 2.

TABLE 1

| No. | Ink No. | Viscosity (cp) | Surface tension (dyne/cm) | Calculated droplet diameter d (μm) | Droplet velocity v (m/sec) | Printer |
|---|---|---|---|---|---|---|
| Example | | | | | | |
| 1 | (1) | 2.9 | 47.3 | 75 | 14 | P |
| 2 | (2) | 2.4 | 38.2 | 44 | 9 | $B_1$ |
| 3 | (3) | 1.7 | 55.3 | 34 | 12 | $B_1$ |
| 4 | (4) | 3.3 | 49.3 | 57 | 7 | $B_2$ |
| 5 | (5) | 2.8 | 54.8 | 47 | 6.5 | P |
| 6 | (6) | 2.9 | 51.1 | 56 | 6.8 | $B_2$ |
| 7 | (7) | 2.4 | 54.2 | 44 | 9.8 | $B_1$ |
| 8 | (5) | 2.8 | 54.8 | 82 | 8.1 | $B_3$ |
| Compara- | | | | | | |

TABLE 1-continued

| No. | Ink No. | Viscosity (cp) | Surface tension (dyne/cm) | Calculated droplet diameter d (μm) | Droplet velocity v (m/sec) | Printer |
|---|---|---|---|---|---|---|
| tive Example | | | | | | |
| 1 | (4) | | | 120 | 10 | P |
| 2 | (4) | 3.3 | 49.3 | 58 | 3.5 | $B_2$ |
| 3 | (4) | | | 62 | 22 | P |
| 4 | (3) | 1.7 | 55.3 | 98 | 8.0 | $B_3$ |
| 5 | (5) | 2.8 | 54.8 | 58 | 5.7 | $B_2$ |
| 6 | (5) | 2.8 | 54.8 | 38 | 17.0 | $B_4$ |

TABLE 2

| No. | Drying characteristic of printed letters | Quality of printed letters |
|---|---|---|
| Example 1 | o | o |
| 2 | o | o |
| 3 | o | o |
| 4 | o | o |
| 5 | o | o |
| 6 | o | o |
| 7 | o | o |
| 8 | o | o |
| Comparative 1 | Δ | x |
| example 2 | x | x |
| 3 | o | x |
| 4 | Δ | x |
| 5 | Δ | o |
| 6 | o | x |

As to the drying characteristic of the printed letters, the printed letters were rubbed with a filter paper [No. 2 (trade name) produced by Toyo Roshi] at the time of 10, 20, 30, 40, 50 and 60 seconds passed after printing by a printer on a commercially available copying paper, respectively, and each was judged based on the number of seconds passed until the printed matter is no longer contaminated (measured at 20° C.±5° C., 50±10% RH) as follows:
  o: within 20 seconds
  Δ: 20–40 seconds
  x: 40 seconds or longer.

As to the printer, $B_1 \sim B_4$ show ink jet printers utilizing heat generating element as the ejecting energy source of ink ($B_1$ has a orifice size 25×20 μm, driving voltage 29 V and frequency 2 KHz, $B_2$ has an orifice size 50×40 μm, driving voltage 25.5 V and frequency 2 KHz, $B_3$ has an orifice size 55×50 μm, driving voltage 28.5 V and frequency 1.2 kHz and $B_4$ has an orifice size 20×20 μm, driving voltage 29.5 V, frequency 1.0 kHz, and P shows an ink jet printer utilizing a piezovibrator as the ejecting energy source of ink (modified product of PJ1080A model, produced by Canon).

As to the printing quality, after printing on a commercially available copying paper, the printed matter is sufficiently dried by leaving to stand for 1 hour, and the extent of feathering, degree of scattering of the ink around the dots, etc., were judged comprehensively, and the case when they are good is rated as o and the bad case as x.

Further, the average velocity v of ink droplets was measured according to a procedure mentioned below. A microscope with a CCD camera is set so that an orifice tip of an ink jet recording head and a position distant by 0.5 mm from its tip may be monitored in a single image of a TV monitor display. The time t (sec.) required until the center of a main droplet in ink droplets flys from the orifice top to a distance of 0.5 mm is measured by use of a stroboscope with a delay circuit while changing its emission timing. Then, the average velocity v (m/sec) is determined according to the formula $$v = \frac{1}{2000t}.$$

As can be seen clearly from the above description, the recording method of the present invention is extremely good in drying characteristics of printed letters even when printed on commercially available general papers, which are subjected to sizing and have fibers exposed on the surface to be recoded, such as note, reporting paper, copying paper, letter paper, postcard, etc., and it is a recording method which is also good in the quality of the printed letters.

We claim:

1. A drop-on-demand ink jet recording method wherein, when the volume of ink ejected from an orifice is V(μm³), the diameter d (μm) of the ink droplet is defined by the following formula:

$$d = 2(3V/4\pi)^{\frac{1}{3}}$$

and the average velocity of an ink droplet ejected from the orifice to a distance of 0.5 mm is v (m/sec), which method comprises:
  providing a recording medium which is subjected to sizing and has fibers exposed on the surface, and
  depositing on the recording medium an ink droplet under conditions which simultaneously satisfy the following formulae:

$$20 \leq d \leq 90$$

$$6 \leq v \leq 15$$

the ink having a surface tension of 35 through 70 dyne/cm at 25° C. and a viscosity of 1.5 through 3.5 cp at 25° C.

2. An ink jet recording method according to claim 1, wherein the ink comprises a water-soluble dye, a water-soluble organic solvent and water as main components.

3. An ink jet recording method according to claim 1 wherein the diameter d (μm) and the average velocity v (m/sec) of the ink droplet satisfy the following formulae, respectively:

$$34 \leq d \leq 82$$

$$65 \leq v \leq 14.$$

* * * * *

UNITED STATES PATENT AND TRADEMARK OFFICE
CERTIFICATE OF CORRECTION

PATENT NO. : 4,952,943
DATED : August 28, 1990
INVENTOR(S) : Kazuo IWATA et al.

It is certified that error appears in the above-identified patent and that said Letters Patent is hereby corrected as shown below:

COLUMN 1:

Line 16, "recording them," should read --recording. Among them,--; and
Line 34, "becomes" should read --become--;
Line 36, "paper" should read --papers--; and
Line 43, "whereby" should be deleted.

COLUMN 2:

Line 28, "droplets of" should read --droplets--; and
Line 30, ""filter" should read --filler--.

COLUMN 3:

Line 14, "$6 \leqq v \leqq 15 \quad (3),$" should read --$6 < v \leqq 15 \quad (3),$--; and Line 45, "$6 < v \leqq 15 \quad (7).$" should read --$6 < v \leqq 15 \quad (7).$--.

UNITED STATES PATENT AND TRADEMARK OFFICE
CERTIFICATE OF CORRECTION

PATENT NO. : 4,952,943
DATED : August 28, 1990
INVENTOR(S) : Kazuo IWATA et al.

It is certified that error appears in the above-identified patent and that said Letters Patent is hereby corrected as shown below:

COLUMN 4:

Line 6, "result should read --results--;
Line 17, "d an v" should read --d and v--;
Line 18, "$65 \leq v \leq 14,$" should read -- $6.5 \leq v \leq 14,$ --

COLUMN 5:

Line 59, "methods." should read --method.--.

COLUMN 6:

Line 1, "Unexamine" should read --Unexamined--.

UNITED STATES PATENT AND TRADEMARK OFFICE
CERTIFICATE OF CORRECTION

PATENT NO. : 4,952,943
DATED : August 28, 1990
INVENTOR(S) : Kazuo IWATA et al.

It is certified that error appears in the above-identified patent and that said Letters Patent is hereby corrected as shown below:

COLUMN 10:

Line 53, "$6 \leqq v \leqq 15$" should read --$6 < v \leqq 15$--;

Line 67, "$65 \leqq v \leqq 14.$" should read --$6.5 \leqq v \leqq 14.$--; and

Line 60, "claim 1" should read --claim 1,--.

Signed and Sealed this

Twelfth Day of May, 1992

Attest:

DOUGLAS B. COMER

Attesting Officer

Acting Commissioner of Patents and Trademarks